United States Patent [19]

Dommert et al.

[11] Patent Number: 5,092,110
[45] Date of Patent: Mar. 3, 1992

[54] PRIMARY EXTRACTOR APPARATUS FOR SUGAR CANE HARVESTER

[75] Inventors: Karl R. Dommert; John Scrivner, both of Thibodaux, La.

[73] Assignee: Cameco Industries, Inc., Thibodaux, La.

[21] Appl. No.: 676,889

[22] Filed: Mar. 28, 1991

[51] Int. Cl.⁵ ............................................. A01D 45/10
[52] U.S. Cl. ..................................... 56/12.8; 56/14.6; 56/16.5; 209/139.1
[58] Field of Search ...................... 56/13.2, 13.3, 13.9, 56/14.3, 16.5, 14.6, 60, 63, 501, 504, 12.8; 241/79, 101.2

[56] References Cited

U.S. PATENT DOCUMENTS

| | | | |
|---|---|---|---|
| 2,755,912 | 7/1956 | Ashton | 198/104 |
| 2,835,298 | 5/1958 | Collins | 146/117 |
| 3,141,281 | 7/1964 | Gaunt et al. | 56/16 |
| 3,377,785 | 4/1968 | Kessler | 56/16 |
| 3,397,520 | 8/1968 | Johnston et al. | 56/1 |
| 3,422,906 | 1/1969 | Bunting et al. | 172/9 |
| 3,473,308 | 10/1969 | Zagorski et al. | 56/63 |
| 3,482,690 | 12/1969 | Driller | 209/147 |
| 3,597,906 | 8/1971 | Bodine | 56/13.3 |
| 3,599,404 | 8/1971 | Fernandez et al. | 56/12.8 |
| 3,673,774 | 7/1972 | Mizzi | 56/13.9 |
| 3,788,048 | 1/1974 | Stiff et al. | 55/406 |
| 3,830,046 | 8/1974 | Rollitt | 56/16.5 |
| 3,848,399 | 11/1974 | Makeham | 56/13.9 |
| 3,925,199 | 12/1975 | Quick | 209/3 |
| 4,019,308 | 4/1977 | Quick | 56/13.9 |
| 4,121,778 | 10/1978 | Quick | 241/79 |
| 4,170,098 | 10/1979 | Moreno et al. | 56/13.9 |
| 4,196,569 | 4/1980 | Quick | 56/13.9 |
| 4,263,772 | 4/1981 | Phillips et al. | 56/13.3 |
| 4,295,325 | 10/1981 | Cannavan | 56/13.9 |
| 4,426,826 | 1/1984 | Wesselmann | 56/16.5 |
| 4,555,896 | 12/1985 | Stiff et al. | 56/13.9 |
| 4,678,129 | 7/1987 | Dallinger | 56/14.3 |
| 4,924,662 | 5/1990 | Quick | 56/13.3 |

*Primary Examiner*—Stephen J. Novosad
*Attorney, Agent, or Firm*—Pravel, Gambrell, Hewitt, Kimball & Krieger

[57] ABSTRACT

A sugar cane harvester primary extractor apparatus is provided for separating cane crop leafy trash material from a harvested stream of conveyed cut billets. The apparatus is used with chopper cane harvesters wherein cane billets are fed continuously into a cleaning chamber in the form of a hollow housing interior of the extractor and a powered extractor fan directed air and leafy trash exiting the cleaning chamber upwardly. Air intakes are in the form of a plurality of side air intake openings each having correspondingly placed vertically extended louver plates angled inwardly of the housing outer wall, each of the side openings and louver plates being spaced along the housing wall beginning at a first position adjacent the cane billet feed inlet and extending rearwardly therefrom toward the middle of the extractor housing.

18 Claims, 3 Drawing Sheets

PRIMARY EXTRACTOR APPARATUS FOR SUGAR CANE HARVESTER

BACKGROUND OF THE INVENTION

1. Field Of The Invention

The present invention relates to sugar cane harvesters and more particularly relates to an improved primary extractor apparatus for use with sugar cane harvesters and more particularly for use with chopper type sugar cane harvesters that cut cane whole stalks into short pieces or billets. Even more particularly, the present invention relates to an improved primary extractor apparatus for use with chopper type sugar cane harvesters that cut cane stalks into billets and wherein the air intake features a plurality of side mounted vertical louvers having inwardly extending louver plates that deflect cane billets and trash away from the air inlet openings, and a rear air inlet opposite the cane billet feed inlet that provides a balanced flow of air into the cleaning chamber for removal of trash and leafy material but which discourages the inadvertent removal of cane billets.

2. General Background

There are various of types of mechanized sugar cane harvesters that harvest the growing cane stalks by cutting the cane at its base, and then transferring the cut cane to a receptacle vehicle such as a cane wagon or cane cart. In the process, leafy trash material is removed from the stalks so that the trash is not carried to the mill.

Some sugar cane harvesters cut the cane stalks into short pieces or billets. In the cutting process leafy material is also cut producing a volume of leafy trash material that is carried along with the crop during harvesting.

Early harvester mechanisms were often attached to a tractor or towed. Examples of early harvesters can be seen in U.S. Pat. No. 2,755,912 to Ashton entitled "Harvesting Mechanism"; U.S. Pat. No. 2,835,298 to Collins entitled "Rotary Cutting Mechanism", U.S. Pat. No. 3,141,281 to Gaunt entitled "Machines For Harvesting Tall Row Crops". In the Gaunt patent a tractor is shown with a harvesting machine attached to the side of the tractor and wherein rotating drums having knives thereon are used to cut the stalks into small pieces. The device is adapted for use with sugar cane as an example. The U.S. Pat. No. 3,377,785 to Kessler, the U.S. Pat. No. 3,397,520 to Johnston and the U.S. Pat. No. 3,422,906 to Bunting show other early types of harvesters.

A topper for use with the sugar cane harvester is the subject of U.S. Pat. No. 3,473,308 issued to Zagorski.

A base cutter, conveying rollers, and chopper drums are seen in a patent to Driller issued Dec. 9, 1969 entitled "Crop Harvester Material Distribution Apparatus", U.S. Pat. No. 3,482,690.

A sugar cane harvesting combine is shown in U.S. Pat. No. 3,599,404 which has a mobile chassis with a supporting framework and wheels, and adjustable cane top severing mechanisms consisting of a shielded disc with blades, and a hydraulic adjustment means with rods to direct the cane to the top cutting area, curved paddles to discharge the cane tops, and a stalk severing mechanism which oppositely rotating horizontal cutters on hydraulically controlled skids, and means directing falling cane into the stalk cutting mechanism, with a series of conveying means to dispose of the cut cane.

The U.S. Pat. No. 3,673,774 to Mizzi provides a sugar cane harvester that has cutters for removing cane tops and cutting the stalks which are conveyed to a chopper having a bladed and a slotted rotary interacting to cut the stalks into billets and deliver them to a cane cleaner of two parallel rotating drums which tear leaf from the billets and discharge them to an elevator, on which they are carried over parallel screws, alternate screws being oppositely wound and oppositely rotated, for pulling leafy matter from the billets before the billets are discharged on the elevator.

U.S. Pat. No. 3,848,399 entitled "Sugar Cane Harvesters" provides a harvester having twin contra-rotating base cutters feeding whole sticks to cane chopping apparatus which sub-divides the sticks. Each base cutter is in the form of a drum, open at one end and arranged with its open end facing downwards. Outwardly projecting blades are mounted at the open end of the drum. The blades are thereby downwardly offset from the closed end of the drum which reduces power consumption and causes less soil and sticks to be fed into the harvester with the cane sticks. The harvester has a plurality of conveying rollers and a pair of contra-rotating cane choppers that receive the cane from the rollers and chop it into billets. The contra-rotating choppers throw the billets into a primary elevator. As the billets fall into the top of the elevator onto the inlet of a secondary elevator they are subjected to an air blast from the blower to remove cane trash. The cane falls from the top end of the elevator into a trailer and is simultaneously subjected to an air current produced by a fan unit to remove any remaining trash.

The U.S. Pat. No. 4,019,308 to Quick entitled "Base Cutting Apparatus For Sugar Cane Harvesters" shows a cane harvester having scrolls, base cutters, conveying rollers to convey cut cane upwardly and rearwardly through the harvester, a topper to cut the tops of cane stalks, contra-rotating drums having cutting knives thereon, and an extractor having a fan for removing trash.

Another U.S. Pat. No. 4,121,778 to Quick provides an air intake for trash removal apparatus of a cane harvester. The air intake forms the lower portion of the housing of the trash removal apparatus and also serves to guide cane billets into the hopper of a pivotally mounted billet discharge conveyer. The air intake is formed as a deflectable air permeable curtain of perforated rubber sheeting which avoids both damage to the air intake and jamming of the conveyor during use. Another version of the air intake includes hanging chains through which air can pass.

The U.S. Pat. No. 4,295,325 to Canavan entitled "Sugar Cane Harvester" provides a self-propelled harvester having a base cutter for cutting cane near the ground level, a chopping cutter for cutting the stalks into billets, a feed for feeding the stalks from the base cutter to the chopping cutter and means for elevating and discharging the billets, the chopping cutter and elevating means including a rotary cutter with a knife blade on a rotating shaft and a thrower having a vein extending from the thrower shaft, the two shafts being parallel and contra-rotated, the cutter knife blade and vein co-acting to sever cane fed into the chopping cutter into billets, the thrower vein acting to throw the severed billets upwardly through a cane guide chute from which they are discharged, preferably into a bin mounted on the main frame and capable of being tilted to empty its contents.

It is known in the art to chop sugar cane into short stalks or billets and to also cut leafy trash material. Early U.S. Pat. Nos. 3,788,048 and 3,830,046 to Massey Ferguson relate to sugar cane chopper harvesters that cut the cane stalks with a base cutter and then convey the stalks rearwardly in the harvester using conveying rollers, one of the sets of conveying rollers being a set of chopping rollers in the form of two rotating drums, each having knife blades thereon. The chopping drums rotate and cut the cane stalk and its attached leafy material into pieces. Thereafter, the cane billets or pieces fall into a hopper or receptacle, and the leafy trash material is separated from the crop with an extractor or cleaning chamber. U.S. Pat. Nos. 3,788,048 and 3,830,046 are hereby incorporated herein by reference.

There have been various attempts to improve the operation of sugar cane harvesters that use chopper knives including drum knife arrangements, and with trash removal. Massey Ferguson has manufactured and offered commercially a number of harvesters which include base cutters to cut the cane stalks at their lower end or base, toppers to cut leafy material off the top of each cane stalk, conveying rollers to convey cane wholestalks rearwardly in the harvester, chopper rollers in the form of rotating drums having knife blades thereon to cut the cane wholestalks into pieces, a powered extractor fan positioned in the upper portion of a cleaning chamber or housing and above a cane billet feed path, and an air outlet above the fan for directing the discharging air and leafy trash exiting the cleaning chamber.

In the Massey Ferguson Model 102 Sugar Cane Harvester, a plurality of horizontal louvers are positioned around a hollow housing interior that defines a cleaning chamber. In the Massey Ferguson model 102, there are four sets of louvers, each set of louvers comprising a plurality of horizontal, spaced apart louvers with louver plates extending outwardly of the primary extractor housing wall. The Massey Ferguson Model 102 Sugar Cane Harvester also includes a forward air intake scoop that includes a downwardly extending intake for allowing air to move inwardly into the primary extractor housing. The Massey Ferguson model 105 Sugar Cane Harvester similarly provides a combination of horizontal louvers and an air intake scoop.

The Massey Ferguson model 205 Sugar Cane Harvester provides a cane harvester having a rear air inlet in the form of a scoop for allowing air to proceed downwardly through the scoop and into the cleaning chamber. The Massey Ferguson model 305 Sugar Cane Harvester is another Massey Ferguson harvester that includes an air intake scoop for allowing air to enter the cleaning chamber.

An Australian company, Austoft (formerly known as "Toft", "Versatile Toft", "Versatile Corporation" and "Toft Brothers") has also manufactured and sold sugar cane harvesters that include a base cutter for cutting the cane stalks at the bottom, a topper for chopping the leafy material off the top of the base cutter, conveying rollers for conveying cut cane stalks rearwardly in the machine, a cutter for severing the cane stalks into a plurality of billets, an extractor fan positioned in the upper portion of a primary extractor housing and positioned above the cane billet crop stream, air intakes for allowing air to flow into the cleaning chamber, and an outlet above the extractor fan for directing the discharging of air and leafy trash material exiting the cleaning chamber.

In the Toft model 4000 and 6000 Sugar Cane Harvesters, air enters the cleaning chamber through a gap between a cylindrical cleaning chamber and an angled or conical plate structure. Austoft Models 7000 and 7700 have an air intake in the form of a gap between a cylindrical cleaning cylinder and an angled plate structure.

In the Versatile Corporation U.S. Pat. No. 4,555,896, issued to Stiff et al., there is provided a sugar cane harvester in which chopped crop is conveyed from a chopping mechanism to a cleaning mechanism. The cleaning mechanism includes an extractor fan positioned in an upper portion of a cleaning cylinder and a substantially unobstructed air intake surrounding the periphery of the cleaning cylinder. The air intake draws air in a generally downwardly direction through the air intake and into the cleaning cylinder, and upwardly through a substantial portion of the crop after the crop exits from the chopping mechanism. Debris is expelled upwardly through the extractor fan, while cleaned crop drops into an elevator for transportation away from the cleaning mechanism.

The assignee of the present application, Cameco Industries, Inc., has also sold sugar cane harvesters under the model number 1000 having an air intake gap between a cylindrical cleaning chamber and an angled or conical plate.

One of the problems of all primary extractors is to prevent a clogging of any air intake structure while at the same time providing for a removal of trash and leafy material but not the removal of the cane billets, which is to be taken to a mill for processing.

The present invention provides an improved primary extractor apparatus for separating cane crop leafy trash material from a harvested stream of conveyed cane billets wherein a plurality of spaced apart vertical louvers are positioned on each side of an extractor housing, each of the lovers including an inwardly extending louver plate that acts as a deflector to prevent trash and other extraneous material from clogging the air inlet, the louver plates also being preferably adjustable in one embodiment in order to increase or decrease the amount of air entering the cleaning chamber through the vertical louvered openings so that air flow can be adjusted based upon changes in crop conditions.

SUMMARY OF THE PRESENT INVENTION

The present invention thus provides an improved sugar cane harvester primary extractor apparatus for separating cane crop, leafy trash material and other extraneous material from a harvested stream of conveyed cane billets.

The apparatus includes an extractor housing having an outer wall and a hollow housing interior that defines a cleaning chamber with front and rear portions.

A cane billet feed path is provided in the form of a plurality of rollers for continuously feeding cane billets into the front portion of the cleaning chamber.

A powered extractor fan is positioned in the upper portion of the housing and above the cane billet feed path.

A rear air intake opening in the housing is provided for introducing air into the cleaning chamber opposite the cane billet feed path.

Left and right, vertically extending side air intake openings are formed through the outer wall of the extractor housing for introducing air into the cleaning chamber on the sides thereof.

Each side air intake opening is provided with a corresponding vertically extended louver plate that is angled inwardly of the housing outer wall and about a generally vertical axis, the side openings and louver plates being spaced along the housing wall beginning at a first position adjacent the cane billet feed path and extending rearwardly therefrom.

Each side opening defines a plane and each plate forms an acute angle with the plane of its corresponding opening.

An outlet is provided above the fan for directing the discharging air and leafy trash material exiting the cleaning chamber.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

FIGS. 1-4 illustrate the preferred embodiment of the apparatus of the present invention designated generally by the numeral 10.

Figure 3:
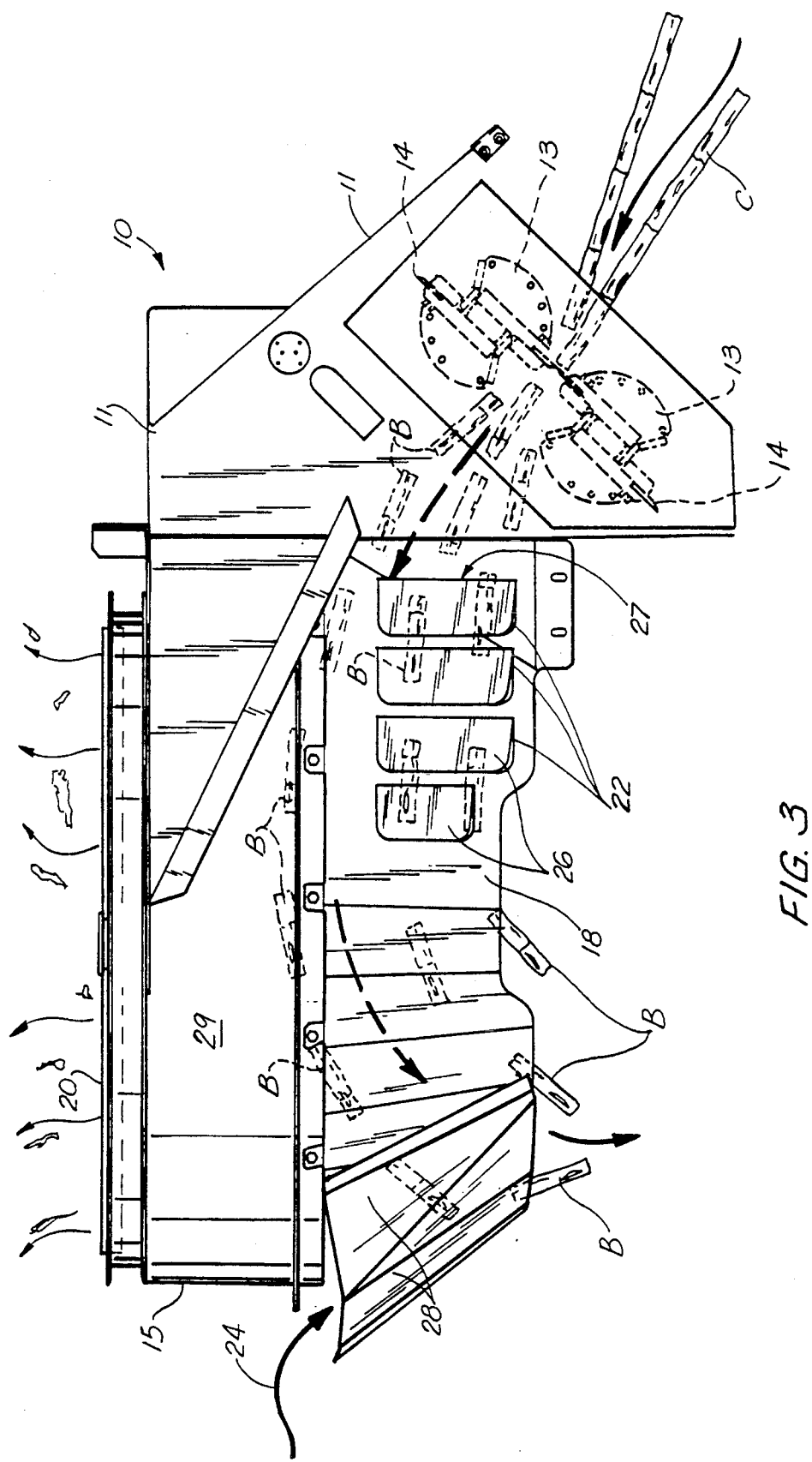
FIG. 3 is a side, elevational view of the preferred embodiment of the apparatus of the present invention

In FIGS. 1-4 sugar cane harvester 10 includes a harvester frame 11, a base cutter, topper, a plurality of feed rollers, a pair of rotary drum cutters 13 with knife blades 14, and a primary extractor housing or frame 15. Extractor housing 15 includes a front 16 end portion and a rear 17 end portion. Housing 15 has an outer wall 18 that circumscribes and defines a hollow housing interior 19. Cane stalks C are fed to the drum cutters 13 using conveying rollers for example, and knives 14 cut the cane stalks C into small sections or billets B. The billets B are pitched upwardly and rearwardly by the drum cutters 13, in an arc fashion as shown in FIG. 3.

Figure 1:
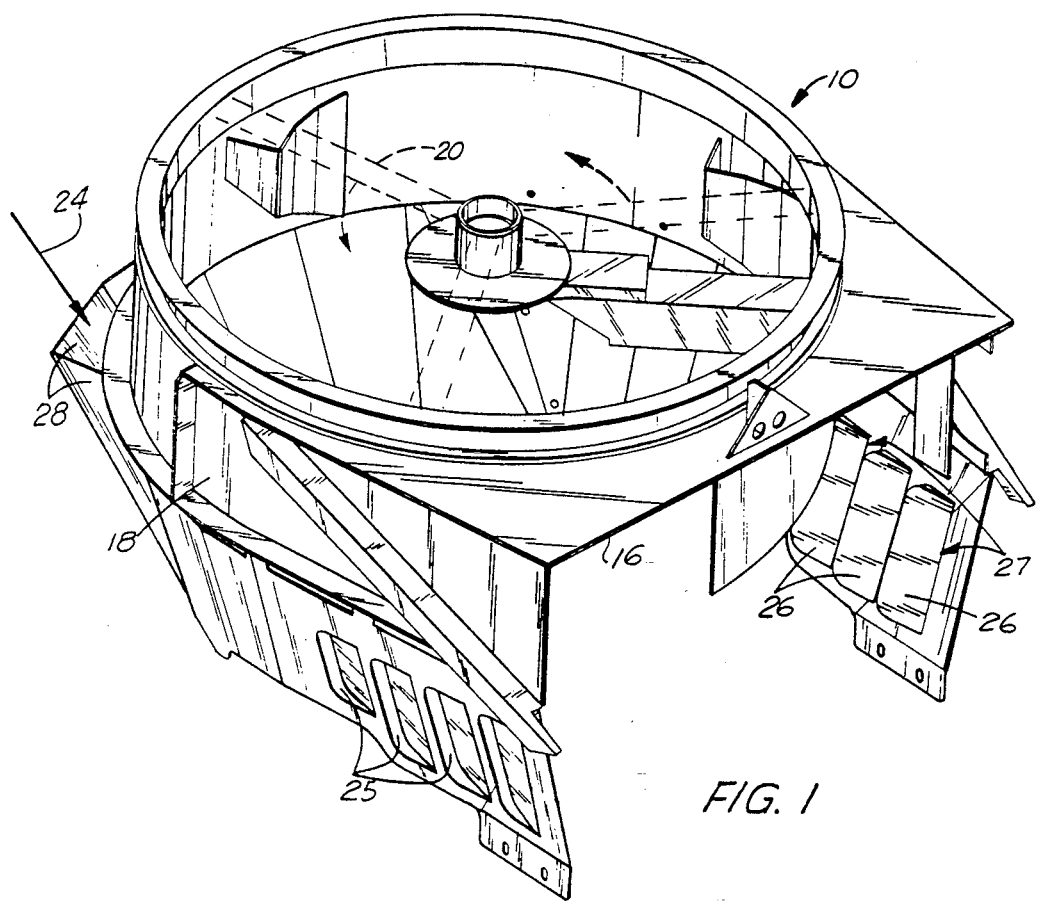
FIG. 1 is a perspective view of the preferred embodiment of the apparatus of the present invention.
Figure 4:
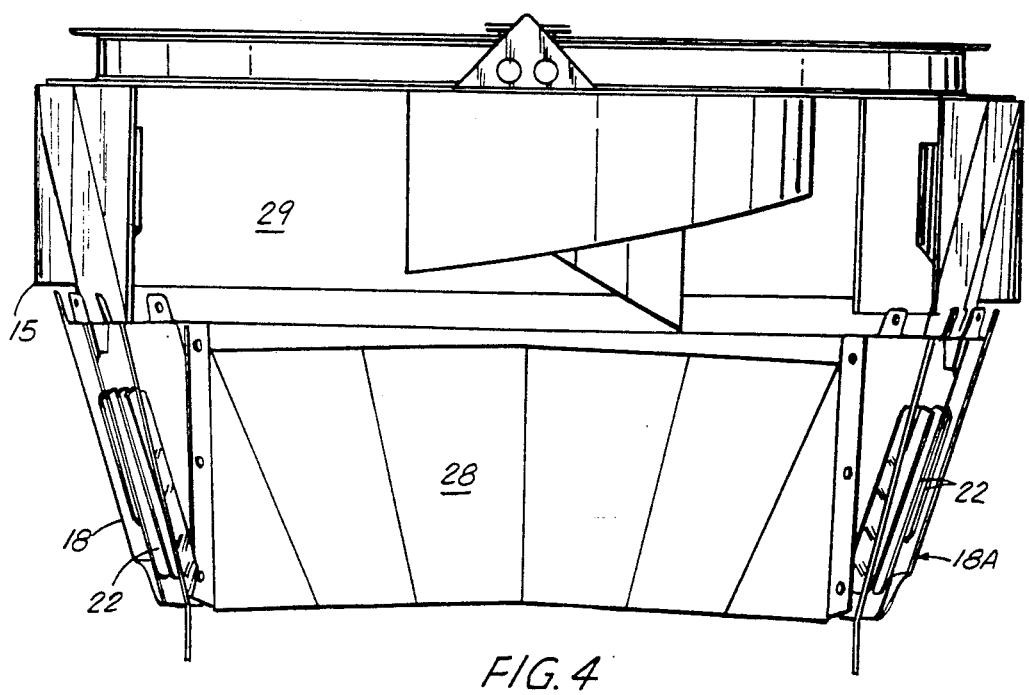
FIG. 4 is a rear view of the preferred embodiment of the apparatus of the present invention.
Figure 2:
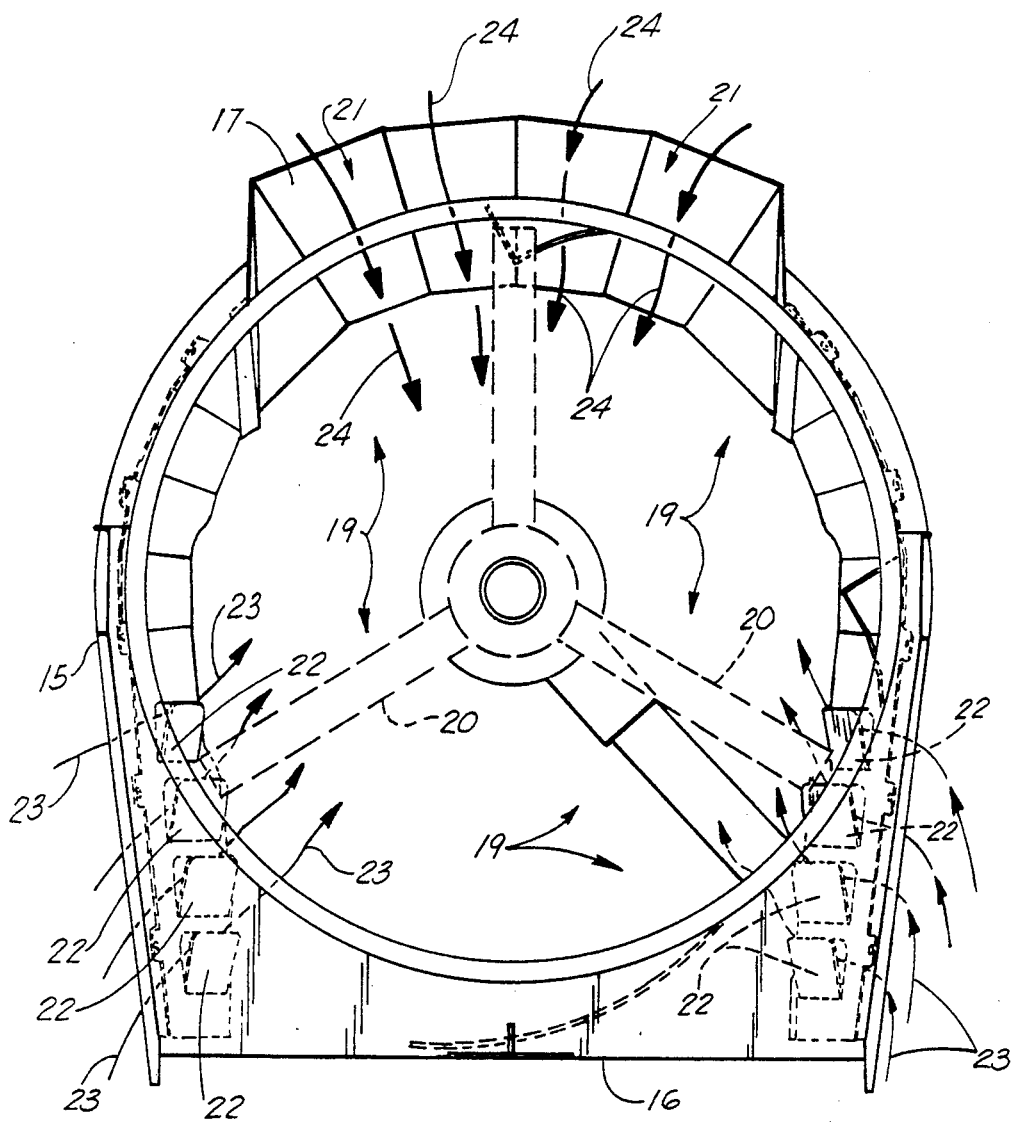
FIG. 2 is a top view of the preferred embodiment of the apparatus of the present invention.

At the top of the housing interior 19, a powered extractor fan 20 is mounted, the fan being hydraulically powered. Rotation of the fan 20 causes air to be pulled into the housing interior 19 through a plurality of openings including rear scoop inlet opening 21 and a plurality of vertical louvered openings 22 (FIG. 1). Air enters the housing interior through louvered openings 22 as shown by the arrows 23 in FIG. 2. Air enters the housing interior 19 through rear scoop opening 21 as shown by the arrows 24 in FIGS. 1, 2 and 3. Scoop opening 21 is formed by angled plate section 28 that extends rearwardly away from the upper, rounded shroud 29 portion of housing wall 18 which forms opening 21. Air can enter opening 21 as shown by arrows 24. Air also enters the housing interior 19 under wall 18.

Each louvered opening 22 is preferably in the form of a generally rectangular vertical opening 25 in the housing outer wall 18. Each rectangular vertical opening 25 has a corresponding louver plate 26 associated therewith and mounted to the rear vertical edge 27 of its respective opening 25. The edge 27 forms a generally vertical or slightly inclined pivotal axis for the pivoting of each plate 26 with respect to axis 27 and the wall 18 of housing 15. The generally vertical pivotal axis 27 can be in the form of a score or bend in the housing wall 18 (FIGS. 1-4) or can simply be a hinge 30 (FIG. 5), each of which allows the plate 26 to be angled about the axis 27 as desired during or after manufacture.

Figure 5:
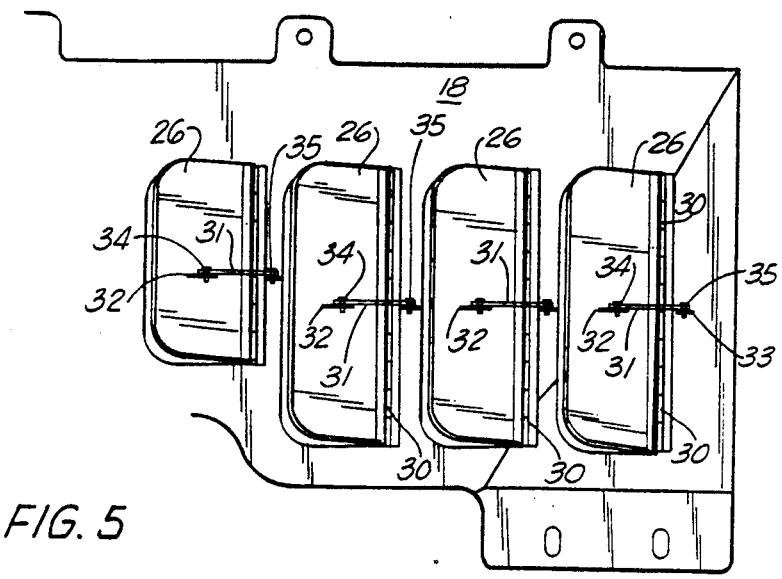
FIG. 5 is a fragmentary view of a second embodiment of the apparatus of the present invention.

It is contemplated that the louver plates 26 would be angled inwardly of wall 18 upon manufacture and by a measure of an acute angle with respect to the plane of wall 18, designated by the numeral 18A in FIG. 5 which would be generally flat in the area of each opening 25.

In the embodiment of FIG. 5, each plate 26 would rotate upon hinge 30 in order to adjust the desired air intake depending upon crop conditions. The plate 26 angular position with respect to sidewall 18 could be fixed using push rod 31 which is mounted at gusset 32 to plate 26 and at gusset 33 to housing wall 18. Bolted connections for example, could be provided at 34, 35 for tightening the push rod and the gussets 32, 33 so as to rigidify the position of a particular plate 26 with respect to sidewall 18. The gusset 32 would have a slot for allowing some play in the position of bolted connection 34 with respect to gusset 32 as the plate 26 is opened and closed upon hinge 30.

A user could slightly adjust the angular orientation of each plate 26 about its pivot 27 to obtain an optimum desired air intake depending upon crop conditions in that particular users area and at a particular time. Housing 15 could be metallic or plastic as could louver plates 26.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A sugar cane harvester having a primary extractor apparatus for separating cane crop leafy trash from a harvested stream of conveyed cane billets comprising:
   a) an extractor housing having an outer wall and a hollow housing interior that defines a cleaning chamber with front and rear portions;
   b) cane billet feed means for continuously feeding cane billets into the front portion of the cleaning chamber;
   c) powered extractor fan positioned in a generally horizontal plane in the upper portion of the housing, above the cane billet feed means;
   d) a rear air intake opening mounted at the rear of the housing and the fan for introducing air into the cleaning chamber opposite the billet feed means and below the extractor fan;
   e) left and right vertically extending side air intake openings through the outer wall for introducing air into the cleaning chamber on the sides thereof;
   f) each side air intake opening having a corresponding vertically extended louver plate angled inwardly of the housing outer wall, the side openings and louver plates being spaced along the housing wall beginning at a first position adjacent the cane billet feed means and extending rearwardly therefrom;

g) each side opening defining a plane and each plate forming an acute angle with the plane of its opening; and h) generally vertical outlet means above the fan for directing the discharging air and leafy trash exiting the cleaning chamber.

2. The apparatus of claim 1 wherein the side air intake openings are generally rectangular in shape.

3. The apparatus of claim 1 wherein each louver plate is angled inwardly of the housing wall about a pivotal axis positioned at the front of its respective side opening.

4. The apparatus of claim 1 wherein each louver plate is correspondingly sized to its respective side opening.

5. The apparatus of claim 1 wherein the side air intake openings are spaced along the housing outer wall beginning at a first position adjacent the cane billet feed means and extending rearwardly therefrom to a second position that approaches the middle of the cleaning chamber.

6. The apparatus of claim 1 further comprising a hinge forming a pivotal connection between each louver plate and the housing outer wall.

7. The apparatus of claim 6 wherein the hinge is a piano hinge.

8. The apparatus of claim wherein the cane billet feed means includes contra-rotating drums having knives thereon.

9. The apparatus of claim wherein the cane billet feed means includes at least one contra-rotating drum that is positioned vertically below the plurality of side air intake openings.

10. The apparatus of claim wherein the cane billet feed means comprises a pair of contra rotating drum cutters positioned forwardly of the plurality of side air intake openings so that cane billets cut by the contra-rotating drums are thrust along a path which travels adjacent the plurality of openings, and each of the louver plates is angled inwardly of the housing outer wall to prevent the cane billets from clogging the rectangular openings.

11. A sugar cane harvester having a chassis, a chopper means for cutting cane stalks into billets, conveying means for conveying cane stalks, and a primary extractor apparatus for separating cane crop leafy trash from a harvested stream of conveyed cane billets comprising:

a) an extractor housing having an outer wall and a hollow housing interior that defines a cleaning chamber with front and rear portions;

b) cane billet feed means for continuously feeding cane billets into the front portion of the cleaning chamber and along an arcuate trajectory through the housing interior;

c) a powered extractor fan positioned in the upper portion of the housing and above the cane billet feed means;

d) a rear air intake opening in the housing for introducing air into the cleaning chamber opposite the billet feed means;

e) left and right vertically extending side air intake openings through the outer wall for introducing air into the cleaning chamber on the sides thereof;

f) each side air intake opening having a corresponding vertically extended adjustable louver plate angled inwardly of the housing outer wall in an adjustable fashion so that the louver plate can be opened and closed with respect to its side air intake opening to vary the amount of incoming air that enters the housing interior therethrough, the side openings and louver plates being spaced along the housing wall beginning at a first position adjacent the cane billet feed means and extending rearwardly therefrom;

g) each side opening defining a plane and each plate forming an acute angle with the plane of its opening; and h) outlet means above the fan for directing the discharging air and leafy trash exiting the cleaning chamber.

12. The apparatus of claim 11 wherein each louver plate hingedly attaches to the housing outer wall.

13. The apparatus of claim 12 wherein each louver plate has a front, vertical edge with a hinge along the front edge.

14. The apparatus of claim 11 wherein each side opening is generally rectangular, having front and rear parallel edges, and each louver plate is correspondingly sized and shaped to fit the opening.

15. The apparatus to claim 14 wherein each louver plate hingedly attaches to the front edge of each opening.

16. A sugar cane harvester having a chassis, a chopper means for cutting cane stalks into billets, conveying means for conveying cane stalks, and a primary extractor apparatus for separating cane crop leafy trash from a harvested stream of conveyed cane billets comprising:

a) an extractor housing having an outer wall and a hollow housing interior that defines a cleaning chamber with front and rear portions;

b) cane billet feed means for continuously feeding cane billets into the front portion of the cleaning chamber and along an arcuate trajectory through the housing interior;

c) a powered extractor fan positioned in the upper portion of the housing and above the cane billet feed means;

d) a rear air intake opening in the housing for introducing air into the cleaning chamber opposite the billet feed means;

e) left and right vertically extending generally rectangular side air intake openings through the outer wall for introducing air into the cleaning chamber on the sides thereof, each side, opening having front and rear parallel edges;

f) each side air intake opening having a corresponding vertically extended adjustable louver plate angled inwardly of the housing outer wall in an adjustable fashion so that the louver plate can be opened and closed with respect to its side air intake opening to vary the amount of incoming air that enters the housing interior therethrough, the side openings and louver plates being spaced along the housing wall beginning at a first position adjacent the cane billet feed means and extending rearwardly therefrom, each louver plate being hingedly attached to the housing outer wall and sized and shaped to fit the side opening;

g) each side opening defining a plane and each plate forming an acute angle with the plane of its opening; and h) outlet means above the fan for directing the discharging air and leafy trash exiting the cleaning chamber.

17. The apparatus of claim 16, wherein each louver plate has a front, vertical edge with a hinge along the front edge.

18. The apparatus of claim 16, wherein each louver plate hingedly attaches to the front edge of each opening.

* * * * *